Figure 1:
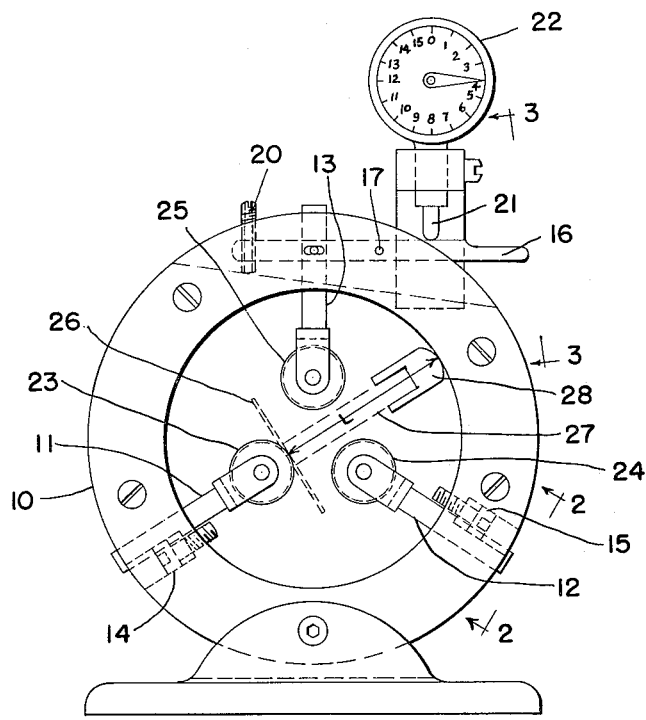

Sept. 4, 1962

M. M. SHUSTER 3,052,035

ADJUSTABLE THREE ROLL INSPECTION GAGE

Filed June 5, 1959

*INVENTOR.*
MYER M. SHUSTER

BY S. J. Rotondi,
A. J. Dupont & H. R. Johns
ATTORNEYS.

3,052,035
ADJUSTABLE THREE ROLL INSPECTION GAGE
Myer M. Shuster, Bennet Hall Apts., Camac and
Lindley Aves., Philadelphia, Pa.
Filed June 5, 1959, Ser. No. 818,488
4 Claims. (Cl. 33—199)
(Granted under Title 35, U.S. Code (1952), sec. 266)

The invention described herein may be manufactured and used by or for the Government for governmental purposes without the payment to me of any royalty thereon.

This invention relates to thread inspecting devices, and has for its principal object the provision of an improved thread inspection device which is quickly and economically operable to inspect a wide range of threads.

In accordance with the present invention, there is provided an inspection device which is adjustable over a wide range of pitch diameters and has the accuracy of three points of radial contact for all pitch diameters extending over a range of one inch or more. This device is readily set to inspect any particular pitch diameter within its range and is quickly operated to inspect one thread after another.

The invention will be better understood from the following description when considered in connection with the accompanying drawings and its scope is indicated by the appended claims.

Figure 2:
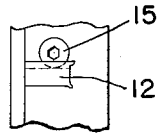
Figures 4, 5:
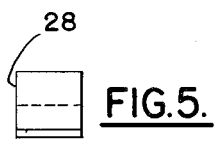
Figure 3:
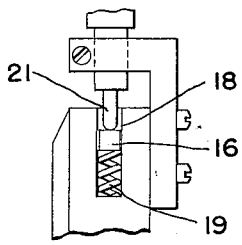

Referring to the drawings:

FIG. 1 is a side view of the thread inspection device,

FIG. 2 is a view taken on the line 2—2 of FIG. 1 and illustrates a detail of the means by which the device is adjusted to inspect threads of different pitch diameters, FIG. 3 is a view taken on the line 3—3 of FIG. 1 and indicates the construction of the coupling or linking mechanism by which a tested specimen is released from the device, and FIGS. 4 and 5 are different views of a setting plug holder or contactor which is used in connection with a setting plug in adjusting the device.

The device of FIG. 1 includes a ring 10 with a known finished inside diameter which is etched or engraved prominently on one of its sides. Three supports 11, 12 and 13, located radially 120° apart, are adjustable radially of the ring 10. Adjustment of the supports 11 and 12 is effected by screws 14 and 15 which bear against a shoulder of the supports as indicated by FIGS. 1 and 2. The support 13 is connected to a lever 16 which is pivoted on a pin 17 in a slot 18 in the body of the ring 10.

The lever 16 is biased by a spring 19 to press the support 13 toward the center of the ring 10 to an extent determined by the adjustment of a screw 20 threaded through the lever and resting against the bottom of the slot 18.

The stem 21 of a dial indicator 22 rests against the lever 16 at a point above the spring 19.

Mounted at the inner ends of the supports 11, 12 and 13 are rolls 23, 24 and 25 which are easily removable with their supports and have threads of the same pitch diameter as the threads to be inspected. The object bearing the threads to be tested is received between these rolls and adjustment in the position of the rolls is effected by means of two pitch wires 26 and a gage block buildup 27 which has a holder or contactor 28 at its outer end. Differently sized thread wires, rolls of different pitch diameter, and gage blocks of different length are required for each different thread to be inspected. The length L of the setting plug 27 is in each instance determined from the following equation:

$$L = \frac{D}{2} + \frac{P.D. + C}{2} - d$$

where $D$ = inner diameter of ring 10
$P.D.$ = basic pitch diameter of the inspected thread
$d$ = diameter of pitch wire 26
$c$ = a constant which is furnished by the manufacturer with each set of pitch wires.

Assuming the pitch wires 26, the rolls 23, 24, and 25 and the gage block buildup 27 to have been selected as indicated above, the roll 23 is adjusted to its operative position by placing the two thread wires 26 in its threads and advancing the screw 14 until the groove inner end of the plug 27 touches the two wires resting in the thread groove of the roll. This adjustment is repeated with the rolls 24 and 25, the block buildup 27 being moved to a position in alinement with the support of the roll in each case. With the rolls thus adjusted, the wires 26 and setting blocks 27 are removed and the indicator 22 is set to zero.

In the operation of the device, the handle 16 is depressed to raise the roller 25, the specimen bearing the thread to be inspected is placed upon the rolls 23 and 24 and the lever 16 is released. The reading of the indicator is zero if the inspected thread is perfect. Otherwise there is indicated at plus or minus value.

I claim:

1. A thread inspecting device including a ring having an inner diameter D, a plurality of supports adjustably attached to said ring and extending inwardly therefrom, said supports terminating at some distance from the center of said ring and bearing at their inner ends rolls having circumferential threads of a pitch diameter P.D. the same as the thread to be inspected, coupling means arranged to resiliently bias one of said supports to its adjusted position, and means for gaging the position of said rolls with respect to the center of said ring, said gaging means including a thread wire having a diameter $d$ and a constant $c$ and a gage block buildup having a length L where $$L = \frac{D}{2} + \frac{P.D. - C}{2} - d$$

2. A thread inspecting device according to claim 1 wherein said coupling means are operable to move said biased support outwardly from its adjusted position.

3. A thread inspecting device according to claim 1 wherein an indicating device is arranged to cooperate with said coupling means for indicating the position of said resiliently biased support and the roll mounted at the inner end thereof.

4. A thread inspecting device according to claim 1 wherein said gaging means includes setting blocks and a contact member adapted to fit between said setting blocks and the inner periphery of said ring.

References Cited in the file of this patent
UNITED STATES PATENTS

| | | |
|---|---|---|
| 1,332,571 | Ray | Mar. 2, 1920 |
| 2,218,111 | Johnson | Oct. 15, 1940 |
| 2,393,094 | Fenn | Jan. 15, 1946 |
| 2,594,143 | Fichter | Apr. 22, 1952 |

FOREIGN PATENTS

| | | |
|---|---|---|
| 555,365 | Great Britain | Aug. 19, 1943 |
| 594,890 | Great Britain | Nov. 21, 1947 |